US011960410B2

(12) United States Patent
Kwong et al.

(10) Patent No.: US 11,960,410 B2
(45) Date of Patent: Apr. 16, 2024

(54) UNIFIED KERNEL VIRTUAL ADDRESS SPACE FOR HETEROGENEOUS COMPUTING

(71) Applicant: ATI Technologies ULC, Markham (CA)

(72) Inventors: Tung Chuen Kwong, Markham (CA); Benjamin Koon Pan Chan, Markham (CA); William Lloyd Atkinson, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/105,331

(22) Filed: Nov. 25, 2020

(65) Prior Publication Data

US 2021/0081328 A1 Mar. 18, 2021

Related U.S. Application Data

(63) Continuation of application No. 16/519,311, filed on Jul. 23, 2019, now Pat. No. 10,853,263.

(51) Int. Cl.
*G06F 12/1009* (2016.01)
*G06F 9/54* (2006.01)
*G06F 12/02* (2006.01)

(52) U.S. Cl.
CPC ......... *G06F 12/1009* (2013.01); *G06F 9/544* (2013.01); *G06F 9/545* (2013.01); *G06F 12/0246* (2013.01)

(58) Field of Classification Search
None
See application file for complete search history.

(56) References Cited

U.S. PATENT DOCUMENTS 6,961,941 B1 * 11/2005 Nelson .................. G06F 9/4401
719/310
7,500,048 B1 * 3/2009 Venkitachalam ... G06F 12/1036
711/6

(Continued)

OTHER PUBLICATIONS

International Search Report and Written Opinion in International Application No. PCT/US2010/043168, dated Nov. 5, 2010, 9 pages.

(Continued)

*Primary Examiner* — Elias Mamo
(74) *Attorney, Agent, or Firm* — KOWERT HOOD MUNYON RANKIN AND GOETZEL PC; Rory D. Rankin

(57) ABSTRACT

Systems, apparatuses, and methods for implementing a unified kernel virtual address space for heterogeneous computing are disclosed. A system includes at least a first subsystem running a first kernel, an input/output memory management unit (IOMMU), and a second subsystem running a second kernel. In order to share a memory buffer between the two subsystems, the first subsystem allocates a block of memory in part of the system memory controlled by the first subsystem. A first mapping is created from a first logical address of the kernel address space of the first subsystem to the block of memory. Then, the IOMMU creates a second mapping to map the physical address of that block of memory from a second logical address of the kernel address space of the second subsystem. These mappings allow the first and second subsystems to share buffer pointers which reference the block of memory.

20 Claims, 7 Drawing Sheets

(56) References Cited

U.S. PATENT DOCUMENTS

| | | |
|---|---|---|
| 7,543,131 B2 | 6/2009 | Hummel et al. |
| 7,548,999 B2 | 6/2009 | Haertel et al. |
| 7,634,584 B2 | 12/2009 | Pope et al. |
| 8,386,745 B2 | 2/2013 | Kegel et al. |
| 9,535,849 B2 | 1/2017 | Kegel et al. |
| 9,628,279 B2 * | 4/2017 | Probert .................. G06F 21/53 |
| 10,198,202 B2 * | 2/2019 | Tsirkin .................. G06F 3/068 |
| 10,459,850 B2 | 10/2019 | Kaplan |
| 10,678,432 B1 | 6/2020 | Dreier et al. |
| 10,853,263 B1 | 12/2020 | Kwong et al. |
| 2004/0064813 A1 * | 4/2004 | Neiger ............... G06F 12/0284 718/1 |
| 2004/0186946 A1 | 9/2004 | Lee |
| 2005/0256976 A1 | 11/2005 | Susairaj et al. |
| 2006/0075146 A1 | 4/2006 | Schoinas et al. |
| 2006/0277348 A1 | 12/2006 | Wooten |
| 2007/0168643 A1 | 7/2007 | Hummel et al. |
| 2008/0114906 A1 | 5/2008 | Hummel et al. |
| 2008/0114916 A1 | 5/2008 | Hummel et al. |
| 2008/0120487 A1 | 5/2008 | Saripalli |
| 2008/0148300 A1 * | 6/2008 | Archer .................. G06F 9/5077 719/330 |
| 2008/0209130 A1 | 8/2008 | Kegel et al. |
| 2009/0037936 A1 | 2/2009 | Serebrin |
| 2009/0043985 A1 | 2/2009 | Tuuk et al. |
| 2009/0187697 A1 | 7/2009 | Serebrin |
| 2009/0187729 A1 | 7/2009 | Serebrin et al. |
| 2010/0191889 A1 | 7/2010 | Serebrin |
| 2012/0017029 A1 | 1/2012 | Santos et al. |
| 2012/0265963 A1 | 10/2012 | Agesen |
| 2013/0159564 A1 | 6/2013 | Duncan et al. |
| 2013/0262736 A1 | 10/2013 | Kegel et al. |
| 2014/0049548 A1 | 2/2014 | Rao |
| 2017/0123971 A1 | 5/2017 | Kanaujia et al. |
| 2018/0136687 A1 | 5/2018 | Tsirkin et al. |
| 2019/0114193 A1 * | 4/2019 | Cha .................... G06F 9/45558 |
| 2019/0236020 A1 | 8/2019 | Jang |
| 2019/0306087 A1 | 10/2019 | Masputra et al. |
| 2019/0370050 A1 | 12/2019 | Kumar et al. |
| 2020/0081638 A1 * | 3/2020 | Zhou ..................... G06F 3/0631 |

OTHER PUBLICATIONS

Office Action from Japanese Patent Application No. 2012521868, dated Jul. 30, 2014, English and Japanese versions, pp. 1-4.

International Search Report and Written Opinion in International Application No. PCT/IB2020/056906, dated Oct. 15, 2020, 9 pages.

Extended European Search Report for European Application No. 20844551.0 dated Jul. 12, 2023.

* cited by examiner

UNIFIED KERNEL VIRTUAL ADDRESS SPACE FOR HETEROGENEOUS COMPUTING

CROSS REFERENCE TO RELATED APPLICATIONS

This application is a continuation of U.S. patent application Ser. No. 16/519,311, entitled "UNIFIED KERNEL VIRTUAL ADDRESS SPACE FOR HETEROGENEOUS COMPUTING", filed Jul. 23, 2019, the entirety of which is incorporated herein by reference.

BACKGROUND

Description of the Related Art

Typically, the sharing of memory buffers between computing devices would require the devices to exchange a pointer or handle in the device address space or in the physical address space. In most cases, before using this pointer, the compute device converts the pointer to the local virtual address space with the memory management unit (MMU) page table mapping. This renders the sharing of the pointer itself or of structures containing pointers inefficient and challenging.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a unified kernel virtual address space for heterogeneous computing are disclosed herein. In one implementation, a system includes at least a first subsystem running a first kernel, an input/output memory management unit (IOMMU), and a second subsystem running a second kernel. In one implementation, the IOMMU creates a unified kernel address space allowing the first and second subsystems to share memory buffers at the kernel level. In order to share a memory buffer between the two subsystems, the first subsystem allocates a block of memory in part of the system memory controlled by the first subsystem. A first mapping is created from a first logical address of the first kernel address space of the first subsystem to the block of memory. Then, the IOMMU creates a second mapping to map the physical address of that block of memory from a second logical address of the second kernel address space of the second subsystem. These mappings allow the first and second subsystems to share buffer pointers in the kernel address space which reference the block of memory.

Figure 1:
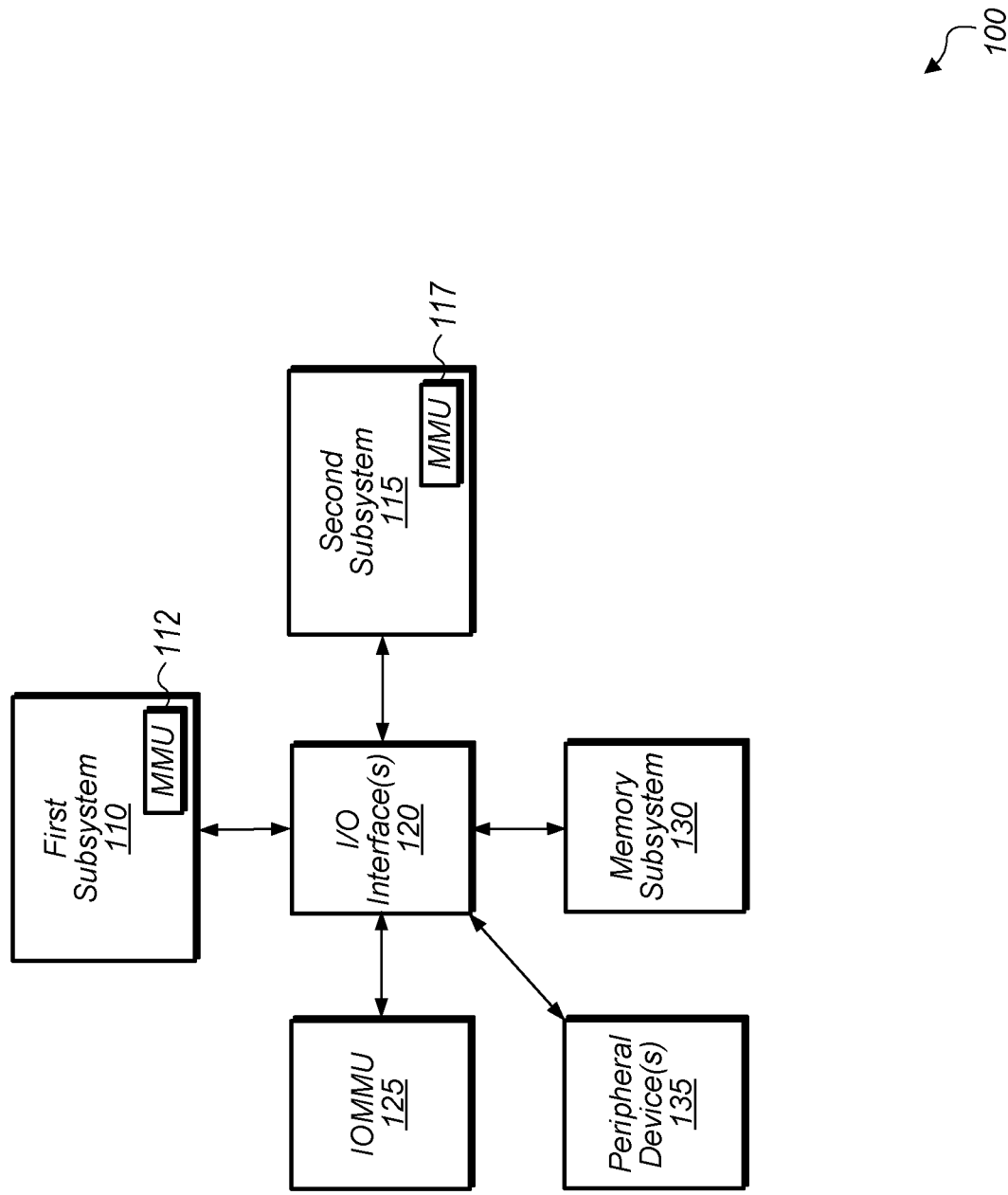
FIG. 1 is a block diagram of one implementation of a computing system.

Referring now to FIG. 1, a block diagram of one implementation of a computing system 100 is shown. In one implementation, computing system 100 includes at least first subsystem 110, second subsystem 115, input/output (I/O) interface(s) 120, input/output memory management unit (IOMMU) 125, memory subsystem 130, and peripheral device(s) 135. In other implementations, computing system 100 can include other components and/or computing system 100 can be arranged differently.

In one implementation, first and second subsystems 110 and 115 have different kernel address spaces, but a unified kernel address space is created by IOMMU 125 for the first and second subsystems 110 and 115. The unified kernel address space allows the first and second subsystems 110 and 115 to pass pointers between each other and share buffers. For first subsystem 110 and second subsystem 115, their respective kernel address space includes kernel logical addresses and kernel virtual addresses. On some architectures, a kernel logical address and its associated physical address differ by a constant offset. Kernel virtual addresses do not necessarily have a linear, one-to-one mapping to physical addresses that characterize kernel logical addresses. All kernel logical addresses are kernel virtual addresses, but kernel virtual addresses are not necessarily kernel logical addresses.

In one implementation, each of first subsystem 110 and second subsystem 115 includes one or more processors which execute an operating system. The processor(s) also execute one or more software programs in various implementations. The processor(s) of first subsystem 110 and second subsystem 115 include any number and type of processing units (e.g., central processing unit (CPU), graphics processing unit (GPU), digital signal processor (DSP), field programmable gate array (FPGA), application specific integrated circuit (ASIC)). Also, first subsystem 110 includes memory management unit (MMU) 112 and second subsystem 115 includes MMU 117, with each MMU handling virtual to physical address translations for its corresponding subsystem. While first and second subsystems 110 and 115 have different kernel address spaces, a unified kernel address space is created by IOMMU 125 for the first and second subsystems 110 and 115, allowing the first and second subsystems 110 and 115 to pass pointers back and forth and share buffers in memory subsystem 130.

Memory subsystem 130 includes any number and type of memory devices. For example, the type of memory in memory subsystem 130 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices 135 can be coupled to I/O interfaces 120. Such peripheral devices 135 include (but are not limited to) displays, keyboards, mice, printers, scanners, joysticks or other types of game controllers, media recording devices, external storage devices, network interface cards, and so forth.

In one implementation, in order to create a memory space that is shared between first subsystem 110 and second subsystem 115, a block of memory is allocated in a part of system memory managed by first subsystem 110. After the initial block of memory is allocated, the proper I/O virtual address (VA) is assigned to the second subsystem 115. In one implementation, an IOMMU mapping is created from the kernel address space of second subsystem 115 to the physical address of the block of memory. In this implementation, IOMMU 125 performs the virtual address mapping for the second subsystem 115 to the block of memory. Then, when additional memory is allocated, the heap allocate function is called, and the address is mapped based on the same I/O VA address that was earlier created. Then, a message is sent to the second subsystem 115 notifying the second subsystem 115 of the unified address.

In various implementations, computing system 100 is a computer, laptop, mobile device, game console, server, streaming device, wearable device, or any of various other types of computing systems or devices. It is noted that the number of components of computing system 100 varies from implementation to implementation. In other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
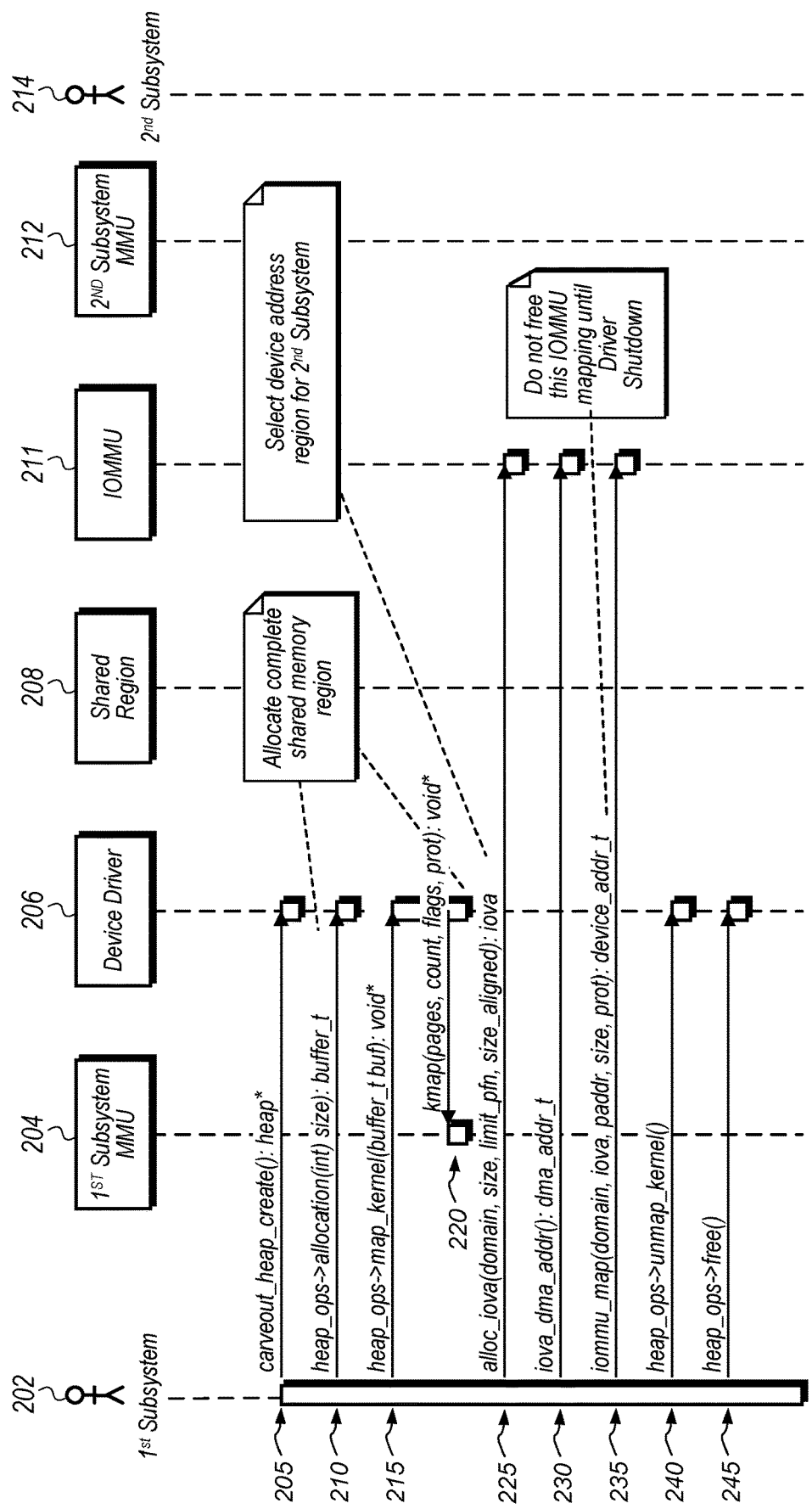
FIG. 2 is a diagram of one implementation of creating a unified kernel virtual address space for heterogeneous computing.

Turning now to FIG. 2, a diagram of one implementation of creating a unified kernel virtual address space for heterogeneous computing is shown. The dashed vertical lines from the top of FIG. 2, from left to right, are representative of a first subsystem 202, a MMU 204 of the first subsystem 202, a device driver 206 executing on the first subsystem 202, a shared region 208 of memory, an IOMMU 211, a MMU 212 of a second subsystem 214, and the second subsystem 214. It is assumed for the purposes of this discussion that first subsystem 202 has a first operating system, that second subsystem 214 has a second operating system, and that the second operating system is different from the first operating system. It is also assumed for the purposes of this discussion that the first subsystem 202 and the second subsystem 214 are part of a heterogeneous computing system. In one implementation, for this heterogeneous computing system, first subsystem 202 and second subsystem 214 are each performing some portion of a workload, and in order to perform the workload, first subsystem 202 and second subsystem 214 share buffer pointers and buffers between each other. The diagram of FIG. 2 illustrates one example of allocating memory to be shared between first subsystem 202 and second subsystem 214.

In one implementation, a first step 205 is performed by device driver 206 to create a heap (i.e., a shared memory region). As used herein, the term "heap" is defined as a virtual memory pool that is mapped to a physical memory pool. Next, in step 210, a desired size of the heap is allocated in the physical memory subsystem. In step 215, a mapping from the kernel to the heap is created. In one implementation, when the carveout heap is first created, a new flag indicates if the heap should come from the kernel logical address space. For example, the kmalloc function returns memory in the kernel logical address space. In one implementation, for a Linux® operating system, the memory manager manages the buffer allocated for the heap using the Linux genpool library. In this implementation, when a buffer is allocated, the buffer is marked in the internal pool and the physical address is returned. The carveout heap then wraps this physical address with the buffer and sg_table descriptors. In one implementation, when the buffer is mapped in the kernel address space, the heap_map_kernel function maps the buffer using kmap instead of vmap in step 220. The function kmap maps the buffer to a given virtual address based on a logical mapping. The selection of kmap or vmap is controlled by a new flag given during carveout heap creation. Alternatively, the heap is created together with the kernel mapping using the genpool library, the carveout application programming interface (API), and the new flag. In this case, the kernel map returns the pre-mapped address. User mode mapping will still be applied on the fly. For second subsystem 214, any shared memory buffer allocated by first subsystem 202 is managed similar to the carveout heap wrapped genpool. The new API allows the addition of an external buffer to the carveout heap. Local tasks on second subsystem 214 allocate from this carveout heap using the same API. After step 220, the allocation of the shared memory region is complete.

Next, in step 225, an input/output (I/O) virtual address is allocated by IOMMU 211 for the shared memory region. Then, in step 230, a contiguous block of DMA address space is reserved for the shared memory region. Next, in step 235, the shared memory region is mapped by IOMMU 211 to the kernel address space of second subsystem 214. It is noted that the IOMMU mapping should not be freed until the device driver 206 has been shutdown. The mapping from the kernel address space of first subsystem 202 to the shared memory region is invalidated in step 240. Then, in step 245, the kernel address space mapping is freed by executing a memory release function.

Figure 3:
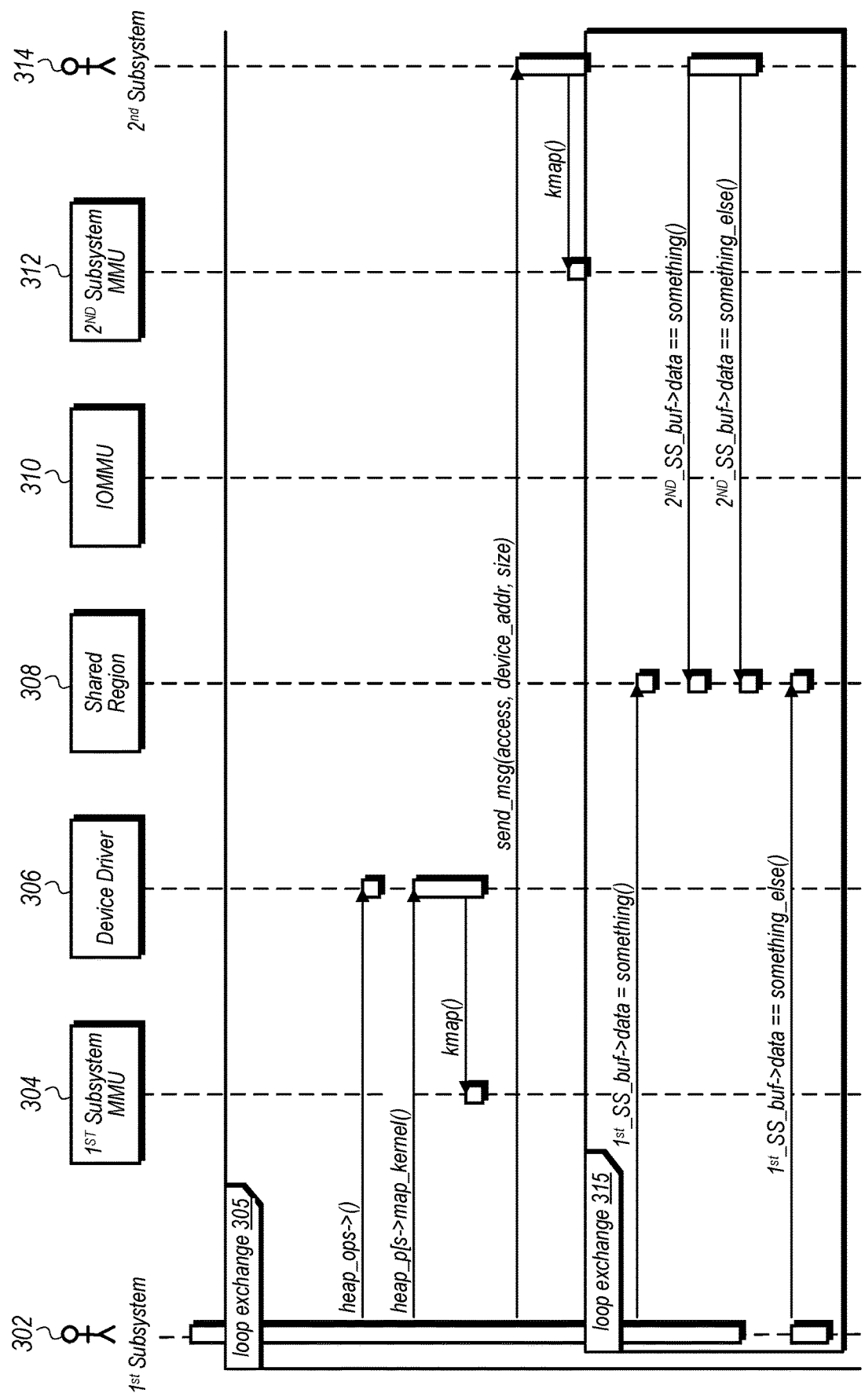
FIG. 3 is a diagram of one implementation of sharing buffers between two separate subsystems.

Referring now to FIG. 3, a diagram of one implementation of sharing buffers between two separate subsystems is shown. The dashed vertical lines extending down from the top of FIG. 3, from left to right, are representative of a first subsystem 302, a MMU 304 of the first subsystem 302, a device driver 306 executing on the first subsystem 302, a shared region 308 of memory, an IOMMU 310, a MMU 312 of a second subsystem 314, and the second subsystem 314. It is assumed for the purposes of this discussion that first subsystem 302 has a first operating system, second subsystem 314 has a second operating system, and the second operating system is different from the first operating system.

For loop exchange 305, a block of memory is allocated and a mapping from the kernel address space of first subsystem 302 to the physical address of the memory block is created by device driver 306. The mapping is then maintained by MMU 304. The memory block can be assigned to second subsystem 314 exclusively, shared between first subsystem 302 and second subsystem 314, or assigned to first subsystem 302 exclusively. Then, a message is sent from first subsystem 302 to second subsystem 314 with the address and size of the block of memory. In one implementation, the message can be sent out-of-band. After the message is received by second subsystem 314, a mapping from the kernel address space of second subsystem 314 to the physical address of the memory block is created and maintained by MMU 312. For loop exchange 315, data is exchanged between first subsystem 302 and second subsystem 314 using the shared region 308. With the unified kernel virtual address, the buffer pointers $1^{st}\_SS\_buf$ and $2^{nd}\_SS\_buf$ are the same and can be freely exchanged between first subsystem 302 and second subsystem 314 and further partitioned using the genpool library.

Figure 4:
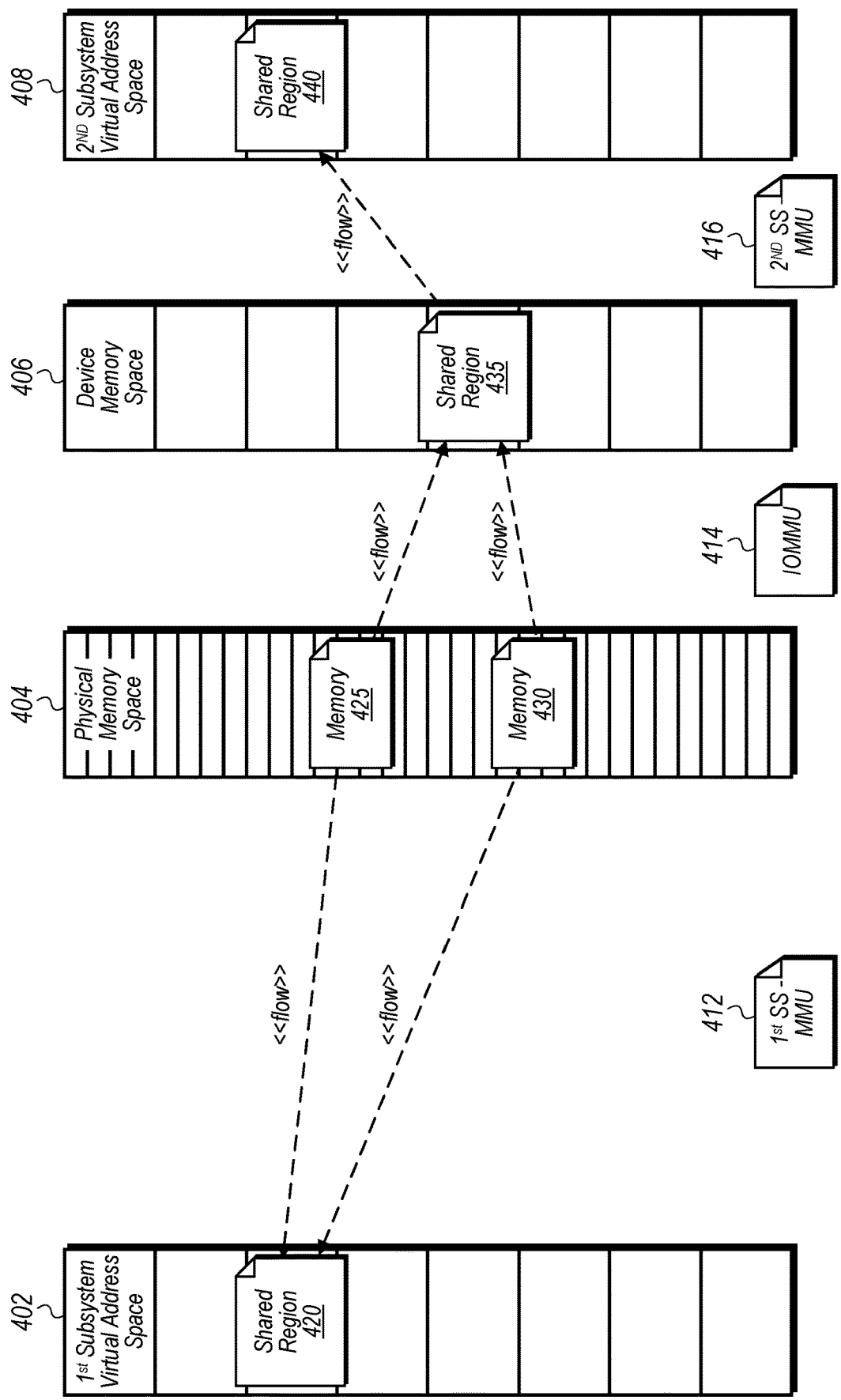
FIG. 4 is a diagram of one implementation of mapping regions of memory to multiple kernel address spaces.

Turning now to FIG. 4, a diagram of one implementation of mapping regions of memory to multiple kernel address spaces is shown. In one implementation, a heterogeneous computing system (e.g., system 100 of FIG. 1) includes multiple different subsystems with their own independent operating systems. The vertically oriented rectangular blocks shown in FIG. 4 are representative of the address spaces for the different components of the heterogeneous computing system. From left to right, the address spaces shown in FIG. 4 are: first subsystem virtual address space 402, physical memory space 404, device memory space 406, and second subsystem virtual address space 408.

In one implementation, first subsystem virtual address space 402 includes shared region 420 which is mapped to memory block 425 and memory block 430 of physical memory space 404. In one implementation, the mappings of shared region 420 to memory block 425 and memory block 430 are created and maintained by first subsystem MMU 412. In order to allow shared region 420 to be shared with the second subsystem, memory block 425 and memory block 430 are mapped to shared region 435 of device memory space 406 by IOMMU 414. Then, shared region 435 is mapped to shared region 440 of second subsystem virtual address space 408 by second subsystem MMU 416. Through this mapping scheme, the first subsystem and the second subsystem are able to share buffer pointers with each other in their kernel address space.

Figure 5:
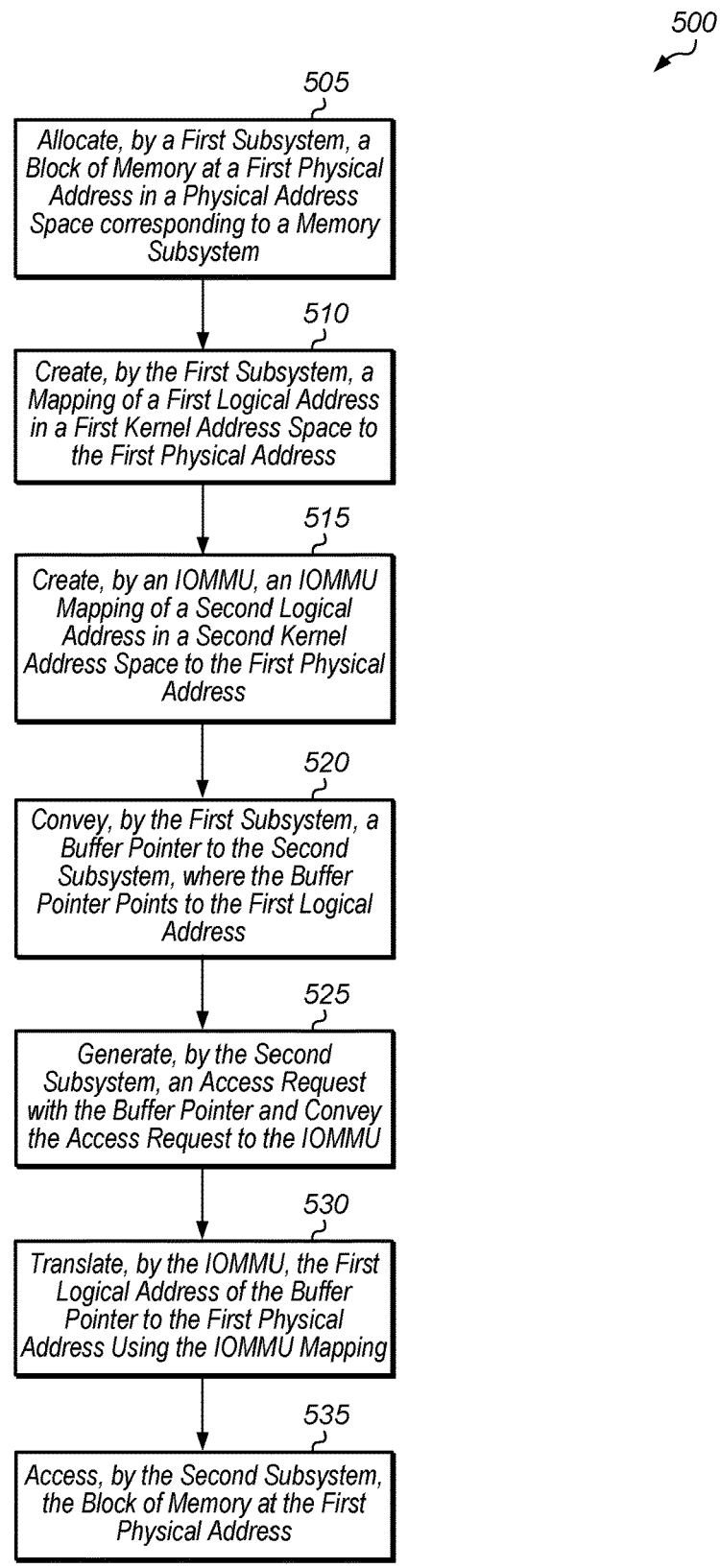
FIG. 5 is a generalized flow diagram illustrating one implementation of a method for creating a unified kernel virtual address space.
Figure 6:
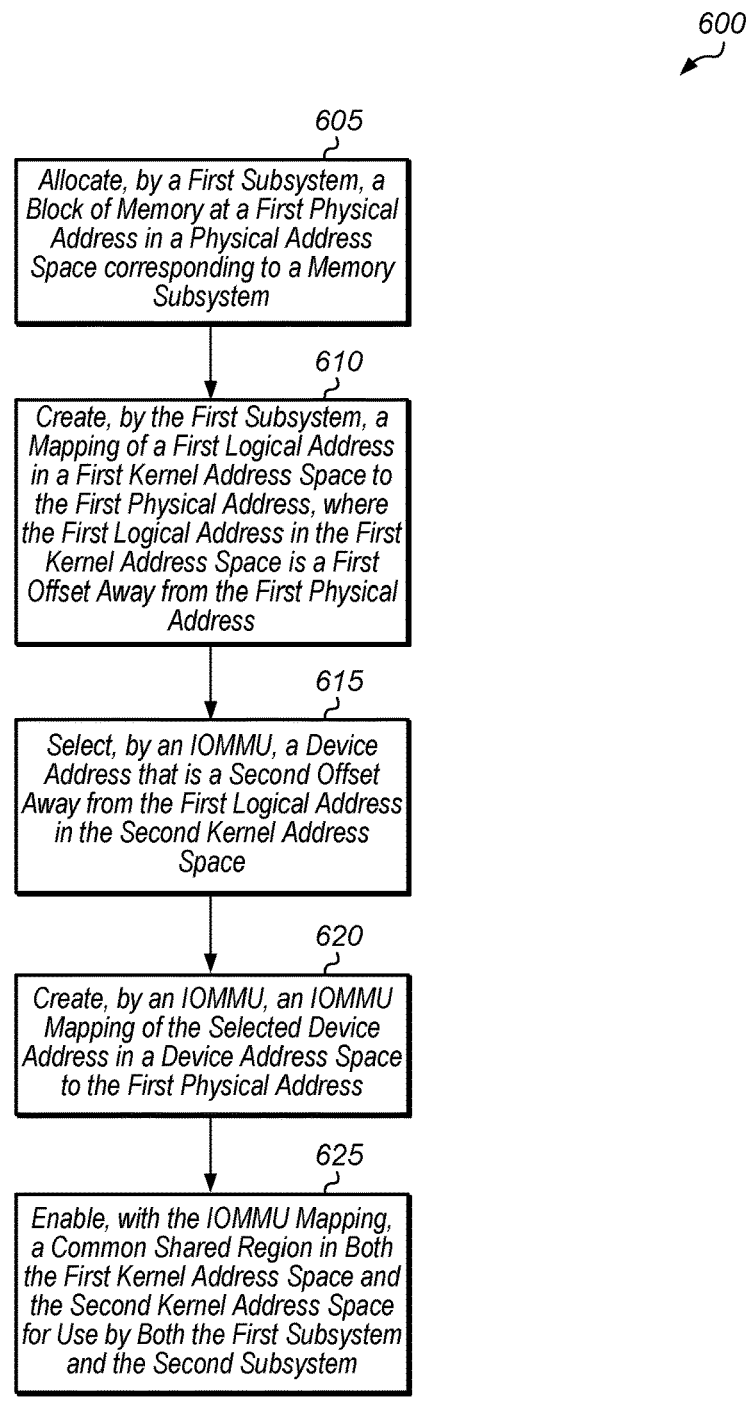
FIG. 6 is a generalized flow diagram illustrating one implementation of a method for enabling a common shared region in multiple kernel address spaces.
Figure 7:
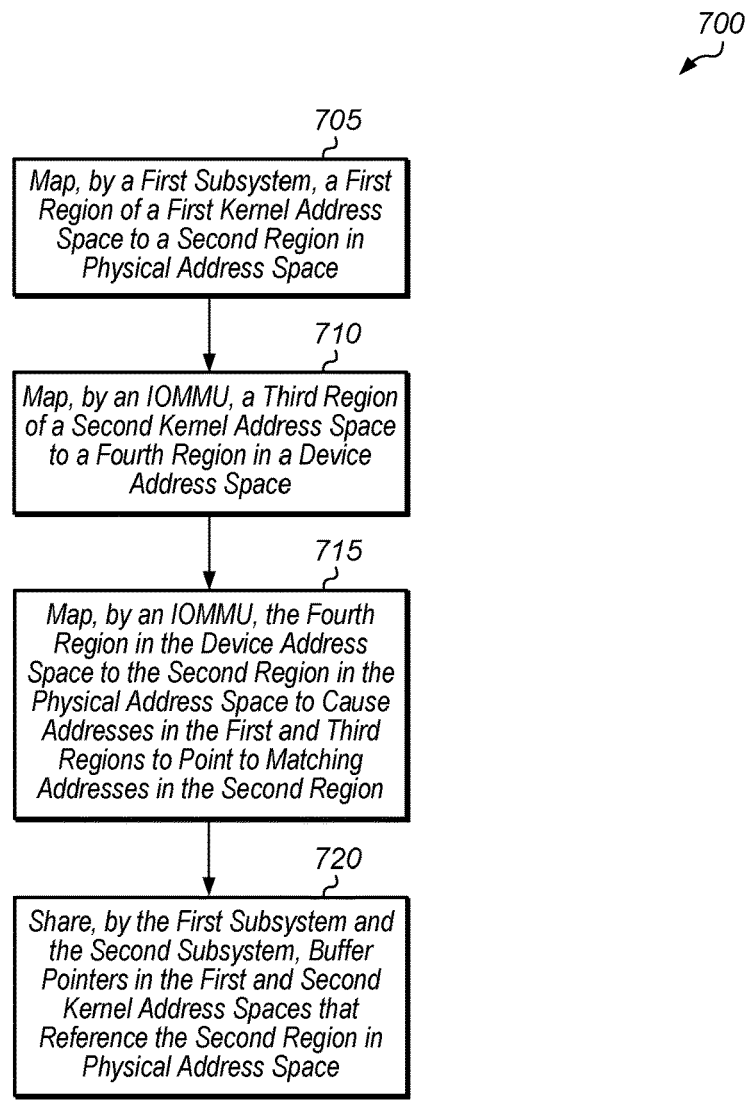
FIG. 7 is a generalized flow diagram illustrating one implementation of a method for enabling buffer pointer sharing between two different subsystems.

Referring now to FIG. 5, one implementation of a method 500 for creating a unified kernel virtual address space is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A first subsystem allocates a block of memory at a first physical address in a physical address space corresponding to a memory subsystem (block 505). In one implementation, the first subsystem executes a first operating system with a first kernel address space. Next, the first subsystem creates a mapping of a first logical address in the first kernel address space to the first physical address (block 510). It is noted that the first logical address space of the first kernel address space is a first linear offset from the first physical address. Then, an IOMMU creates an IOMMU mapping of a second logical address in a second kernel address space to the first physical address (block 515). In one implementation, the second kernel address space is associated with a second subsystem. It is noted that the second logical address space of the second kernel address space is a second linear offset from the first physical address.

Next, the first subsystem conveys a buffer pointer to the second subsystem, where the buffer pointer points to the first logical address (block 520). Then, the second subsystem generates an access request with the buffer pointer and conveys the access request to the IOMMU (block 525). Next, the IOMMU translates a virtual address of the buffer pointer to the first physical address using the previously created IOMMU mapping (block 530). Then, the second subsystem accesses the block of memory at the first physical address (block 535). After block 535, method 500 ends.

Turning now to FIG. 6, one implementation of a method 600 for enabling a common shared region in multiple kernel address spaces is shown. A first subsystem allocates a block of memory at a first physical address in a physical address space corresponding to a memory subsystem (block 605). It is assumed for the purposes of this discussion that the system described by method 600 includes the first subsystem and a second subsystem. It is also assumed that the first subsystem executes a first operating system with a first kernel address space and the second subsystem executes a second operating system with a second kernel address space. The first subsystem creates a mapping of a first logical address in the first kernel address space to the first physical address, where the first logical address in the first kernel address space is a first offset away from the first physical address (block 610).

Next, an IOMMU selects a device address that is a second offset away from the first logical address in the second kernel address space (block 615). Then, the IOMMU creates an IOMMU mapping of the selected device address in the device address space to the first physical address (block 620). The IOMMU mapping enables a common shared region in both the first kernel address space and the second kernel address space for use by both the first subsystem and the second subsystem (block 625). After block 625, method 600 ends.

Referring now to FIG. 7, one implementation of a method 700 for enabling buffer pointer sharing between two different subsystems is shown. A first subsystem maps a first region of a first kernel address space to a second region in physical address space (block 705). In one implementation, the physical address space corresponds to a system memory controlled by the first subsystem. Next, an IOMMU maps a third region of a second kernel address space to a fourth region in a device address space (block 710). It is assumed for the purposes of this discussion that the second kernel address space corresponds to a second subsystem which is different from the first subsystem. Then, the IOMMU maps the fourth region in the device address space to the second region in the physical address space to cause addresses in the first and third regions to point to matching (i.e., identical) addresses in the second region (block 715). The first subsystem and second subsystem are able to share buffer pointers in the first or second kernel address spaces that reference the second region in physical address space (block 720). After block 720, method 700 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form.

Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   mapping a first region of a first kernel address space to a first region in a first physical address space;
   mapping a first region of a second kernel address space to the first region in the first physical address space, wherein mapping the first region of the second kernel address space to the first region in the first physical address space comprises mapping the first region of the second kernel address space to a first region in a device memory space, and mapping the first region in the device memory space to the first region in the first physical address space;
   enabling a common shared region in both the first kernel address space and the second kernel address space for use; and
   creating a unified kernel address space, based at least in part on the common shared region.

2. The method as recited in claim 1, further comprising:
   passing a buffer pointer from a first subsystem to a second subsystem different from the first subsystem using the unified kernel address space, to enable the first subsystem and the second subsystem to share at least one buffer.

3. The method as recited in claim 2, wherein the common shared region is enabled for sharing by both the first subsystem and the second subsystem.

4. The method as recited in claim 1, wherein addresses in the first region of the first kernel address space are mapped to same locations in the first physical address space as addresses in the first region of the second kernel address space.

5. The method as recited in claim 1, wherein said mapping of the first region of the first kernel address space to the first region in the first physical address space is performed by a first subsystem.

6. The method as recited in claim 5, wherein said mapping of the first region of the second kernel address space to the first region in first physical address space is performed by a second subsystem different from the first subsystem.

7. The method as recited in claim 6, wherein mapping the first region of the second kernel address space to a device memory space is performed by an input/output memory management unit.

8. A system comprising:
   a first subsystem comprising circuitry configured to map a first region of a first kernel address space to a first region in a first physical address space; and
   a second subsystem comprising circuitry configured to map a first region of a second kernel address space to the first region in first physical address space, wherein the second subsystem is configured to map the first region of the second kernel address space to a first region in a device memory space, and map the first region in the device memory space to the first region in the first physical address space;
   wherein the system configured to enable a common shared region in both the first kernel address space and the second kernel address space for use, and create a unified kernel address space, based at least in part on the common shared region.

9. The system as recited in claim 8, wherein the second subsystem is configured to:
   pass a buffer pointer to the first subsystem using the unified kernel address space; and
   share at least one buffer with the first subsystem using the buffer pointer.

10. The system as recited in claim 8, wherein addresses in the first region of the first kernel address space are mapped to same locations in the first physical address space as addresses in the first region of the second kernel address space.

11. The system as recited in claim 8, wherein the second subsystem is an input/output memory management unit.

12. The system as recited in claim 8, wherein the first subsystem is configured to allocate the first region in the first physical address space.

13. The system as recited in claim 8, wherein the first subsystem is configured to convey to the second subsystem a pointer to a location in the first region of the first physical address space, wherein the first subsystem is configured to convey the pointer to the second subsystem via the common shared region.

14. The system as recited in claim 13, wherein the second subsystem comprises an input/output memory management unit configured to map the first region of the second kernel address space to the first region in first physical address space.

15. A system comprising:
   a memory device;
   a first processing device comprising circuitry configured to map a first region of a first virtual address space to a region in the memory device; and
   a second processing device comprising circuitry configured to:
   map a first region of a second virtual address space to the region in the memory device such that the region in the memory device is shared by the first processing device and the second processing device, wherein to map the first region of the second virtual address space to the region in the memory device, the second processing device is further configured to map the first region of the second virtual address space to a first region in a device memory space, and map the first region in the device memory space to the region in the memory device; and
   create a unified kernel address space, based at least in part on an enabled common shared region with the first processing device.

16. The system as recited in claim 15, wherein the second processing device is configured to:
  pass a buffer pointer to the first processing device, using the unified kernel address space, to enable sharing of at least one buffer with the first processing device.

17. The system as recited in claim 15, wherein addresses in the first region of the first virtual address space are mapped to same locations in the memory device as addresses in the first region of the second virtual address space.

18. The system as recited in claim 15, wherein the second processing device comprises an input/output memory management unit configured to map the device memory space to the region in the memory device.

19. The system as recited in claim 15, wherein the first processing device is configured to allocate the region in the memory device.

20. The system as recited in claim 15, wherein the first processing device is configured to convey to the second processing device a pointer to a location in the region of the memory device, wherein the first processing device is configured to convey the pointer to the second processing device via the region in the memory device.

\* \* \* \* \*